US006888837B1

(12) United States Patent
Cunningham et al.

(10) Patent No.: US 6,888,837 B1
(45) Date of Patent: May 3, 2005

(54) NETWORK ADDRESS TRANSLATION IN A NETWORK HAVING MULTIPLE OVERLAPPING ADDRESS DOMAINS

(75) Inventors: Timothy Cunningham, Groton, MA (US); Thomas Meehan, New York, NY (US); Manish Patel, Tyngsboro, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/274,940

(22) Filed: Mar. 23, 1999

(51) Int. Cl.[7] .......................... H04L 12/56; H04L 12/28; G06F 15/16; G06F 15/173
(52) U.S. Cl. ....................... 370/401; 370/389; 370/392; 709/245; 709/238; 709/249
(58) Field of Search ............................... 370/389, 392, 370/400, 401, 393, 395.54, 410, 438, 465, 474, 475; 709/238, 245

(56) References Cited

U.S. PATENT DOCUMENTS

| | | | | |
|---|---|---|---|---|
| 6,331,984 B1 | * | 12/2001 | Luciani | 370/401 |
| 6,434,627 B1 | * | 8/2002 | Millet et al. | 709/245 |
| 6,456,625 B1 | * | 9/2002 | Itoi | 370/401 |
| 6,510,154 B1 | * | 1/2003 | Mayes et al. | 370/389 |
| 6,629,137 B1 | * | 9/2003 | Wynn | 709/223 |
| 6,694,429 B1 | * | 2/2004 | Kalmanek et al. | 713/153 |

OTHER PUBLICATIONS

May 1994, Egevang et al., "The IP Network Address Translator (NAT)" (memo in response to the Network Working Group'Request for Comments 1631).

* cited by examiner

*Primary Examiner*—Seema S. Rao
*Assistant Examiner*—Ronald Abelson
(74) *Attorney, Agent, or Firm*—Steubing McGuinness & Manaras LLP

(57) ABSTRACT

A technique for translating addresses in a communication network having multiple overlapping address domains involves mapping an overlapping local address from a first address domain to a unique global address that is specific to a second address domain. The unique global address is used by any device in the second address domain to reference the device in the first address domain having the overlapping local address. Furthermore, a packet sent from a source host in the first address domain to a destination host in the second address domain requires at least a source address translation in order to translate the source host local address used within the first address domain into a source host global address that is used within the second address domain, and may also require a destination address translation in order to translate the destination host global address used within the first address domain into a destination host local address used within the second address domain.

18 Claims, 13 Drawing Sheets

| Source Local Address | Protocol | Source Port | Source Address Domain | Destination Address Domain | Translated Source Port | Source Global Address |
|---|---|---|---|---|---|---|
| A (host X) | | | 1 | 2 | | A12 |
| A (host X) | | | 1 | 3 | | A13 |
| A (host X) | | | 1 | 4 | | A14 |

202 — row 1
204 — row 2
206 — row 3

FIG. 2A

| Source Local Address | Protocol | Source Port | Source Address Domain | Destination Address Domain | Translated Source Port | Source Global Address |
|---|---|---|---|---|---|---|
| A (host Y) | | | 2 | 1 | | A21 |
| A (host Y) | | | 2 | 3 | | A23 |
| A (host Y) | | | 2 | 4 | | A24 |

208 — row 1
210 — row 2
212 — row 3

FIG. 2B

| Source Local Address | Protocol | Source Port | Source Address Domain | Destination Address Domain | Translated Source Port | Source Global Address |
|---|---|---|---|---|---|---|
| A (host Z) | | | 3 | 1 | | A31 |
| A (host Z) | | | 3 | 2 | | A32 |
| A (host Z) | | | 3 | 4 | | A34 |

214 — row 1
216 — row 2
218 — row 3

FIG. 2C

| | Destination Global Address | Protocol | Translated Destination Port | Source Address Domain | Destination Address Domain | Destination Port | Destination Local Address |
|---|---|---|---|---|---|---|---|
| 220 | A12 | | | 2 | 1 | | A (host X) |
| 222 | A13 | | | 3 | 1 | | A (host X) |
| 224 | A14 | | | 4 | 1 | | A (host X) |
| 226 | A21 | | | 1 | 2 | | A (host Y) |
| 228 | A23 | | | 3 | 2 | | A (host Y) |
| 230 | A24 | | | 4 | 2 | | A (host Y) |
| 232 | A31 | | | 1 | 3 | | A (host Z) |
| 234 | A32 | | | 2 | 3 | | A (host Z) |
| 236 | A34 | | | 4 | 3 | | A (host Z) |
| 238 | B | | | 0 | 4 | | B |

FIG. 2D

NETWORK ADDRESS TRANSLATION IN A NETWORK HAVING MULTIPLE OVERLAPPING ADDRESS DOMAINS

CROSS-REFERENCE TO RELATED APPLICATIONS

This patent application may be related to the following commonly owned U.S. patent application, which is hereby incorporated by reference in its entirety:

application Ser. No. 09,274,944, U.S. Pat. No. 6,493,765, entitled DOMAIN NAME RESOLUTION IN A NETWORK HAVING MULTIPLE OVERLAPPING ADDRESS DOMAINS, to Timothy Cunningham, Thomas Meehan, Manish Patel, and Greg Koester, filed on even date herewith.

FIELD OF THE INVENTION

The present invention relates generally to communication networks, and, more particularly, to translating network addresses in a network having multiple overlapping address domains.

BACKGROUND OF THE INVENTION

In today's information age, communication networks are increasingly used for transferring information among a multitude of communication devices. As demand for communication services continues to grow, the demand on these communication networks for carrying increasing amounts of information at increasing speeds continues to grow. Therefore, communication networks are evolving to more efficiently handle these increased demands.

In a common networking model, a large communication network is typically constructed by segregating the multitude of communication devices into a number of subnetworks, and internetworking the subnetworks over a high-speed backbone network. In such a communication network, each communication device is typically assigned a network address that is used for routing packets between a source communication device and a destination communication device within the communication network. In order to permit efficient use of these network addresses, the communication network may be logically divided into multiple address domains. Network addresses are required to be unique within a particular address domain, but are not required to be unique across multiple address domains.

Unfortunately, when the communication network is logically divided into multiple address domains having overlapping network addresses, a particular network address may map to multiple communication devices, in which case the network address does not uniquely identify one communication device within the communication network. Such an overlapping network address cannot be used as the destination address of a packet because it is ambiguous as to the destination communication device for the packet. Likewise, such an overlapping network address, when used as the source address of a packet, is ambiguous as to the source communication device for the packet.

Thus, a need has remained for a network address translation technique for resolving ambiguous network addresses across multiple overlapping address domains.

SUMMARY OF THE INVENTION

In accordance with one aspect of the invention, an overlapping local address from an inbound address domain is translated into a unique global address that is specific to a specified outbound address domain.

In accordance with another aspect of the invention, a network address translator receives a translation request message that includes the overlapping local address and specifies the outbound address domain. The network address translator transmits a translation response message including the unique global address for the outbound address domain that maps to the overlapping local address in the inbound address domain.

In accordance with yet another aspect of the invention, a network address translator receives a packet that includes a source address equal to an overlapping source host local address in a source (inbound) address domain, and also includes a destination address equal to a unique destination host global address. The network address translator maintains a number of source address translation entries, where each source address translation entry maps a source host local address from a source (inbound) address domain into a unique source host global address that is specific to a destination (outbound) address domain. In order to translate the source address of the packet, the network address translator finds the source address translation entry that maps the source host local address from the source (inbound) address domain to the unique source host global address for the destination (outbound) address domain, extracts the source host global address from the source address translation entry, and inserts the source host global address as the source address of the packet. The network address translator may also maintain a number of destination address translation entries, where each destination address translation entry maps a unique destination host global address for a source (inbound) address domain to a destination host local address for a destination (outbound) address domain. In order to translate the destination address of the packet, the network address translator finds the destination address translation entry that maps the destination host global address to the destination host local address for the destination (outbound) address domain, extracts the destination host local address from the destination address translation entry, and inserts the destination host local address as the destination address of the packet

BRIEF DESCRIPTION OF THE DRAWINGS

The foregoing and other objects and advantages of the invention will be appreciated more fully from the following further description thereof with reference to the accompanying drawings wherein:

FIG. 2A is a diagram showing an exemplary source address translation table for a first source (inbound) address domain in the communication network in accordance with a preferred embodiment of the present invention;

FIG. 2B is a diagram showing an exemplary source address translation table for a second source (inbound) address domain in the communication network in accordance with a preferred embodiment of the present invention;

FIG. 2C is a diagram showing an exemplary source address translation table for a third source (inbound) address domain in the communication network in accordance with a preferred embodiment of the present invention;

FIG. 2D is a diagram showing an exemplary destination address translation table in accordance with a preferred embodiment of the present invention;

DETAILED DESCRIPTION OF A PREFERRED EMBODIMENT

Figure 1:
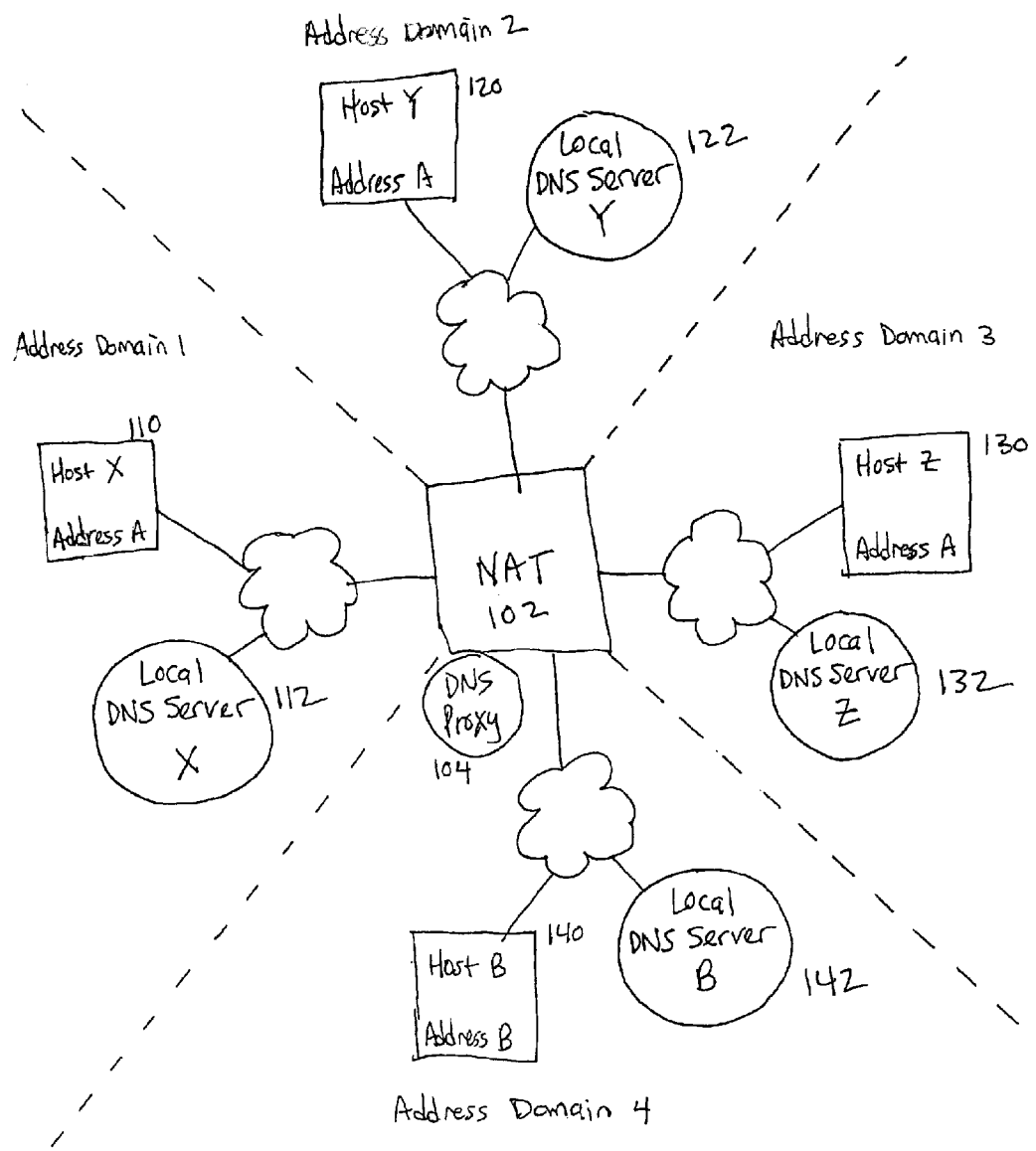
FIG. 1 is a block diagram showing an exemplary communication network having multiple overlapping address domains in accordance with a preferred embodiment of the present invention.

As discussed above, a need has remained for a network address translation technique for resolving ambiguous network addresses across multiple overlapping address domains. In accordance with the present invention, a network address translator (NAT) maps an overlapping domain-specific network address in a first address domain (referred to hereinafter as a "local address") to a unique global address that is specific to a second address domain. Thus, the overlapping network address in the first address domain may map to multiple global addresses, where each global address is unique to one of the other address domains. The NAT uses the network address mappings to translate the source address and/or the destination address of a packet before the packet is routed from the source communication device (referred to hereinafter as the "source host") to its intended destination communication device (referred to hereinafter as the "destination host"). Specifically, the NAT translates the destination address from a destination host global address (which uniquely identifies both the source address domain and the destination address domain) to its corresponding destination host local address, upon determining that the destination address requires an address translation. Likewise, the NAT translates the source address from an overlapping source host local address to a unique source host global address based upon the source address domain and the destination address domain, upon determining that the source address requires an address translation. By translating the source address and/or the destination address, the resulting packet is able to be routed to the destination host in the destination address domain using the destination host local address, and the destination host is able to uniquely identify the source host for the packet using the unique source host global address.

Network address translation has been used in the past to allow local addresses to be reused within a communication network. One prior art network address translation technique is described in an Internet Engineering Task Force (IETF) document entitled *The IP Network Address Translator (NAT)*, by K. Egevang and P. Francis (May 1994). In a typical prior art embodiment, the NAT maps a local address to a single global address irrespective of the destination address domain. Thus, when the local address is included as the source address in a packet, the NAT translates the local address into the global address without regard for the destination address domain before forwarding the packet to the destination host. Likewise, when the global address is included as the destination address in a packet, the NAT translates the global address into the local address before routing the packet to the destination host.

In certain networking models, it is desirable for the local address to map to a different global address for each destination address domain. The present invention provides a network address translation technique that allows the local address to be mapped to a different global address for each destination address domain. Specifically, a preferred NAT maps the local address to a different global address for each destination address domain, where each global address is unique within the communication network and maps uniquely to the local address. When the local address is included as the source address in a packet transmitted to a particular destination address domain, the preferred NAT translates the local address into the specific global address for the destination address domain. Likewise, when a global address is included as the destination address of a packet, the preferred NAT translates the global address into the local address.

In a preferred embodiment of the present invention, the NAT performs address translations for routing packets in a communication network having multiple overlapping address domains, such as the exemplary communication network 100 as shown in FIG. 1. In the exemplary communication network 100, there are three (3) hosts that share a common network address A across three (3) overlapping address domains, namely host X 110 in address domain 1, host Y 120 in address domain 2, and host Z 130 in address domain 3. There is also one (1) host with a non-overlapping network address, namely host B 140 in address domain 4. Thus, the address A represents the local address for each host that uniquely identifies a particular host within its own address domain. Unfortunately, the address A is ambiguous within the entire communication network 100, since it does not uniquely identify a specific host within the entire communication network 100. Therefore, the communication network 100 includes a NAT 102 to perform, among other things, the network address translations needed to resolve the ambiguity of the address A within the communication network 100.

In order for a host in an address domain q to reference a host in an address domain p having the overlapping address A, the NAT 102 maps the overlapping address A from the address domain p to a global address that is unique to the address domain q and is also unique within the communication network 100. For convenience, the global address for a host having the local address A in the address domain p when referenced from a host in the address domain q is represented by the symbol Apq. Thus, Apq is the global address for the address A in address domain p when referenced from address domain q.

Thus, with reference to the example shown in FIG. 1, the NAT 102 typically maintains at least the following global address mappings:

A12 is the host X global address when referenced from address domain 2;

A13 is the host X global address when referenced from address domain 3;

A14 is the host X global address when referenced from address domain 4;

A21 is the host Y global address when referenced from address domain 1;

A23 is the host Y global address when referenced from address domain 3;

A24 is the host Y global address when referenced from address domain 4;

A31 is the host Z global address when referenced from address domain 1;

A32 is the host Z global address when referenced from address domain 2; and

A34 is the host Z global address when referenced from address domain 4.

In a preferred embodiment of the present invention, the NAT 102 maintains a separate source address translation table for each overlapping address domain, and maintains a single destination address translation table. Each source address translation table maps the overlapping network addresses in the source address domain to the corresponding global addresses for each of the potential destination address domains. The destination address translation table maps the global addresses to their corresponding local addresses.

Thus, in the example shown in FIG. 1, the preferred NAT 102 maintains three (3) source address translation tables and one (1) destination address translation table. An exemplary source address translation table for address domain 1, shown in FIG. 2A, maps the host X local address (i.e., A) to the respective host X global addresses for domains 2, 3, and 4 (i.e., A12, A13, and A14, respectively). An exemplary source address translation table for address domain 2, shown in FIG. 2B, maps the host Y local address (i.e., A) to the respective host Y global addresses for domains 1, 3, and 4 (i.e., A21, A23, and A24, respectively). An exemplary source address translation table for address domain 3, shown in FIG. 2C, maps the host Z local address (i.e., A) to the respective host Z global addresses for domains 1, 2, and 4 (i.e., A31, A32, and A34, respectively). No source address translation table is maintained for address domain 4, since, in this example, address domain 4 has no overlapping network addresses. An exemplary destination address translation table, shown in FIG. 2D, maps the global addresses to their corresponding local addresses.

It should be noted that, by maintaining the source (inbound) domain and the destination (outbound) domain in the tables, it is possible to combine all source address translation tables into a single source address translation table. It should also be noted that, by maintaining the source (inbound) domain and the destination (outbound) domain in the tables, the source table(s) and the destination table provide redundant information, such that, for example, the source address translation table(s) can be searched in reverse to obtain a local address corresponding to a particular global address, or the destination address translation table can be searched in reverse to obtain a global address corresponding to a particular local address in the source address domain. These and other alternative embodiments will be apparent to a skilled artisan.

In order to transfer a packet from the source host in the source address domain to the destination host in the destination address domain using network address translation, the appropriate entries must be created in the source address table(s) and the destination address table. Specifically, for any network address that must be translated, there must be a source address translation table entry mapping the source host local address in the source address domain to a unique source host global address for the destination address domain, and there must be a destination address translation table entry mapping the source host global address for the destination address domain back to the source host local address in the source address domain.

Typically, the address translation table entries are created dynamically by the NAT 102, although the address translation table entries may alternatively be created manually. In order for the NAT 102 to create a source address translation table entry and its corresponding destination address translation table entry, the NAT 102 is provided with at least a source host local address, a source address domain identifier, and a destination address domain identifier. The NAT 102 selects a source host global address from a pool of global network addresses, and creates the address translation table entries. Specifically, the NAT 102 creates a source address translation table entry mapping the source host local address in the source address domain to the selected source host global address for the destination address domain, and creates a destination address translation entry mapping the selected source host global address for the destination address domain to the source host local address in the source address domain.

Figure 3:
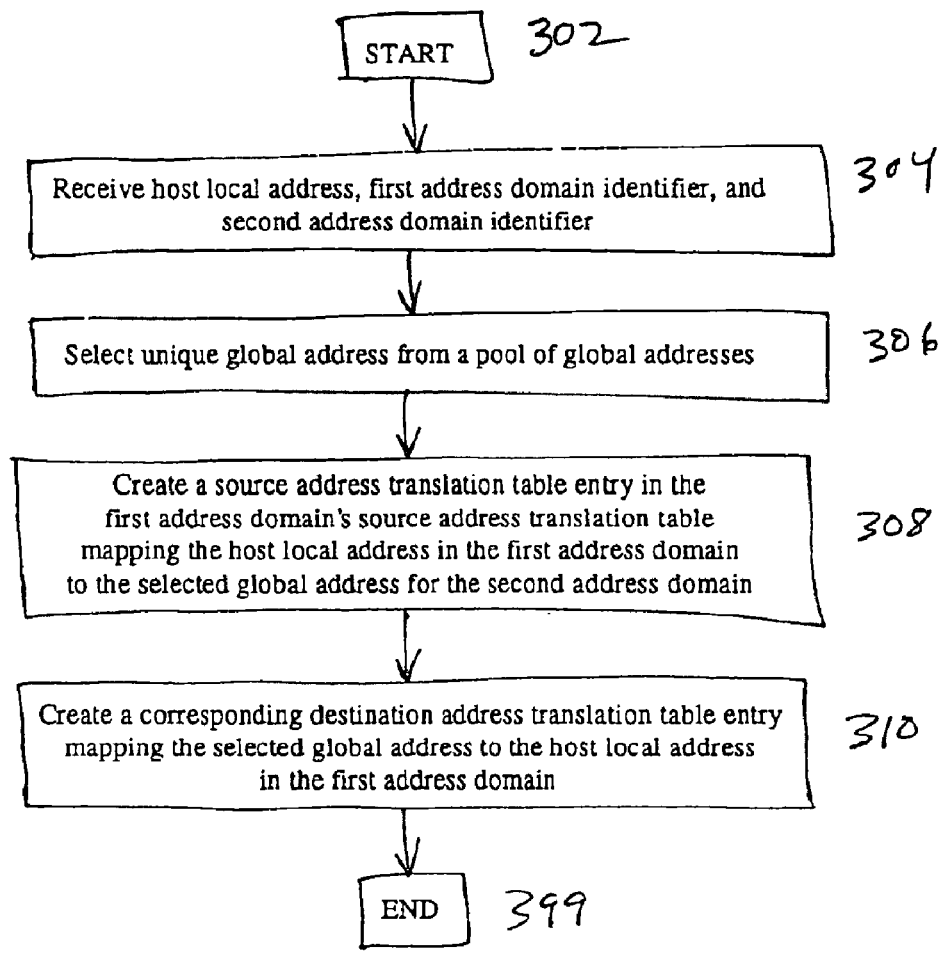
FIG. 3 is a logic flow diagram showing exemplary network address translator logic for creating a source address translation table entry and a corresponding destination address translation table entry in accordance with a preferred embodiment of the present invention.

FIG. 3 is a logic flow diagram showing exemplary NAT 102 logic for creating a source address translation table entry and its corresponding destination address translation table entry. Beginning at step 302, the logic receives a host local address, a first address domain identifier identifying the host address domain, and a second address domain identifier identifying an address domain from which the host is referenced, in step 304. The logic proceeds to select a unique global address for the host, in step 306, preferably from a pool of global addresses maintained by the NAT 102. Upon selecting the unique global address in step 306, the logic creates a source address translation table entry in the first address domain's source address translation table, in step 308, and a corresponding destination address translation table entry, in step 310. The source address translation table entry maps the host local address in the first address domain to the selected global address for the second address domain. The destination address translation table entry maps the selected global address to the host local address in the first address domain. The logic terminates in step 399.

In a preferred embodiment of the present invention, the NAT 102 dynamically creates certain address translation table entries as part of a domain name resolution procedure, and dynamically creates other address translation entries as part of a packet processing procedure (described in more detail below). The domain name resolution procedure is described in the related U.S. patent application entitled DOMAIN NAME RESOLUTION IN A NETWORK HAVING MULTIPLE OVERLAPPING ADDRESS DOMAINS, which was incorporated by reference above. The domain name resolution procedure enables the source host to obtain a destination host global address for the destination host based upon a domain name of the destination host. More particularly, in order for the source host to transmit a packet to the destination host, the source host is provided with a domain name that is associated with the destination host. The domain name uniquely identifies the destination host, although the domain name is not a network address. The source host invokes the domain name resolution procedure in order to resolve the domain name into the destination host global address. Because the destination host local address may overlap with other addresses when the communication network includes multiple overlapping address domains, a preferred domain name resolution procedure utilizes network address translation to translate the overlapping destination host local address into a unique destination host global address.

Specifically, in order for the source host to resolve the destination host domain name into the destination host global address, the source host sends a domain name resolution request to a local DNS Server in the source address domain. The domain name resolution request includes, among other things, a source address equal to the source host local address and the domain name associated with the destination host. The local DNS Server in the source address domain maintains a cache of domain name/network address mappings for hosts within the source address domain. Upon receiving the domain name resolution request from the source host, the local DNS Server in the source address domain determines the destination host domain name corresponds to a host in a different address domain. The local DNS Server therefore sends a domain name resolution request to the DNS Proxy 104.

The DNS Proxy 104 performs domain name resolution across multiple address domains. Upon receiving the domain name resolution request from the local DNS Server in the source address domain, the DNS Proxy 104 determines the destination address domain for the destination host domain name, and sends a domain name resolution request to the local DNS Server in the destination address domain. The local DNS Server in the destination address domain maintains a cache of domain name/network address mappings for hosts within the destination address domain. Upon receiving the domain name resolution request from the DNS Proxy 104, the local DNS Server 122 in the destination address domain resolves the domain name, and returns the destination host local address to the DNS Proxy 104.

Upon receiving the destination host local address from the local DNS Server in the destination address domain, the DNS Proxy 104 sends a translation request to the NAT 102 to translate the destination host local address into a unique destination host global address. The translation request includes, among other things, a source address domain identifier, the destination host local address, and a destination address domain identifier.

The NAT 102 maintains a pool of global network addresses, and also maintains a number of address translation entries, where each address translation entry maps a local host address from one address domain to a global address that is specific to another address domain. Upon receiving the translation request from the DNS Proxy 104, the NAT 102 first determines whether there is an existing address translation table entry mapping the destination host local address to a destination host global address that is specific to the source address domain. If there is not an existing address translation table entry mapping the destination host local address to a destination host global address that is specific to the source address domain, then the NAT 102 creates the appropriate address translation table entries. Specifically, the NAT 102 selects a destination host global address from the pool of global network addresses, and creates both a source address translation entry and a corresponding destination address translation entry mapping the destination host local address to the destination host global address specifically for the source address domain. The source address translation table entry includes a Source Local Address field equal to the destination host local address, a Source Address Domain field equal to the destination address domain, a Destination Address Domain field equal to the source address domain, and a Source Global Address field equal to the selected destination host global address. The corresponding destination address translation table entry includes a Destination Global Address field equal to the selected destination host global address, a Source Address Domain field equal to the source address domain, a Destination Address Domain field equal to the destination address domain, and a Destination Local Address field equal to the destination host local address. The NAT 102 sends a translation response to the DNS Proxy 104 including the destination host global address.

Upon receiving the translation response from the NAT 102, the DNS Proxy 104 sends a domain name resolution response to the local DNS Server in the source address domain including the destination host global address. The local DNS Server in the source address domain, in turn, sends a domain name resolution response to the source host including the destination host global address. Thus, the domain name associated with the destination host is resolved into a unique destination host global address that the source host can use to transmit a packet to the destination host.

Figure 4:
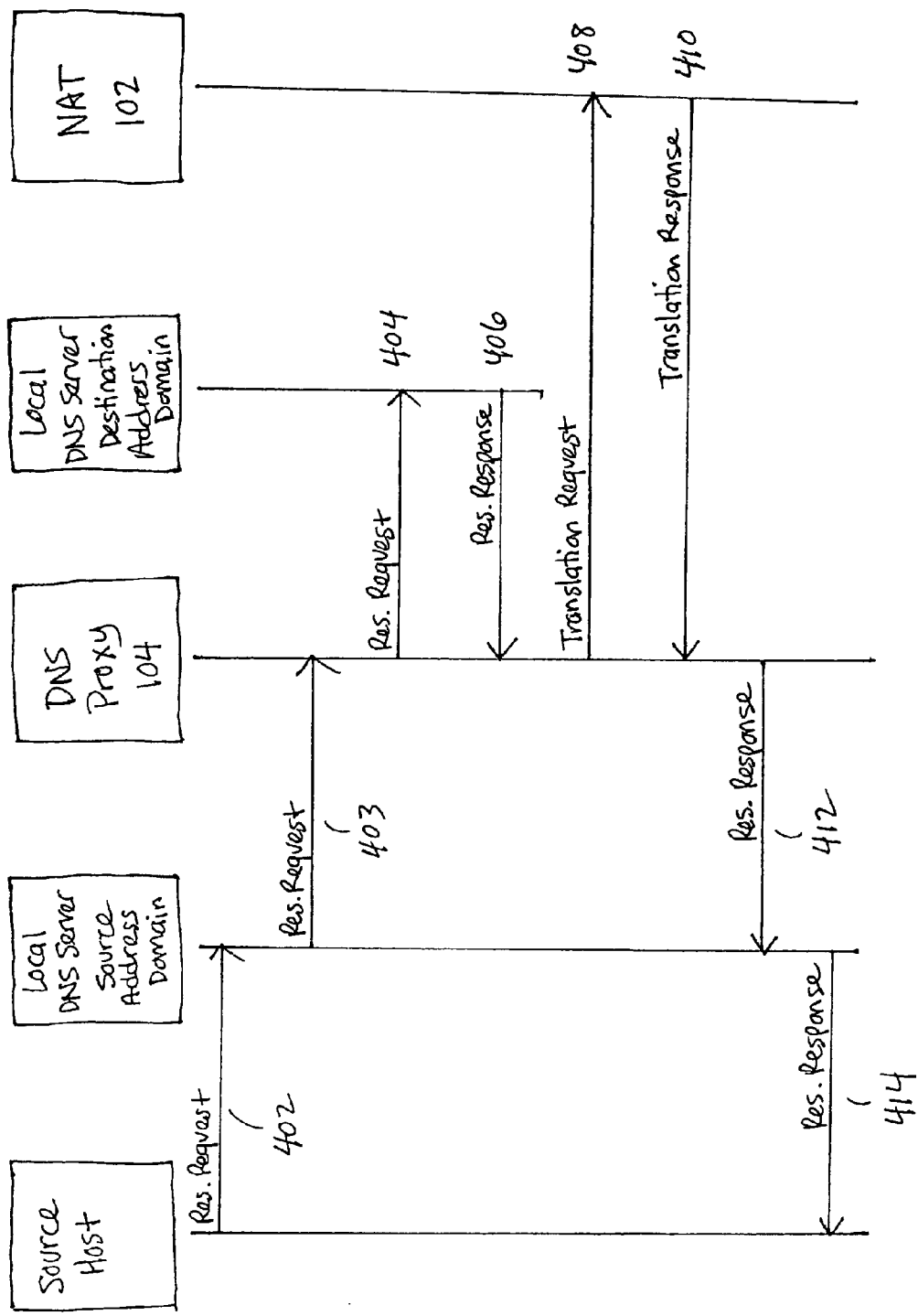
FIG. 4 is a message flow diagram showing an exemplary message flow for resolving a domain name into a destination host global address in accordance with a preferred embodiment of the present invention.

FIG. 4 is a message flow diagram showing an exemplary message exchange among the source host in the source address domain, the local DNS Server in the source address domain, the DNS Proxy 104, the local DNS Server in the destination address domain, and the NAT 102 for resolving the destination host domain name into the unique destination host global address. Specifically, the source host sends a domain name resolution request message 402 to the local DNS Server in the source address domain including, among other things, a source address equal to the source host local address and the destination host domain name. Since the local DNS Server in the source address domain is unable to resolve the destination host domain name, the local DNS Server in the source address domain sends a domain name resolution request message 403 to the DNS Proxy 104. The DNS Proxy 104, in turn, sends a domain name resolution request message 404 to the local DNS Server in the destination address domain including, among other things, the destination host domain name. Upon receiving the domain name resolution request message 404, the local DNS Server in the destination address domain resolves the destination host domain name into its corresponding destination host local address, and sends a domain name resolution response message 406 to the DNS Proxy 104 including, among other things, the destination host local address. Upon receiving the domain name resolution response message 406 including the destination host local address, the DNS Proxy 104 sends a translation request message 408 to the NAT 102 including, among other things, the source address domain identifier, the destination host local address, and the destination address domain identifier. Upon receiving the translation request message 408, the NAT 102 creates the appropriate address translation entries, if necessary, and sends a translation response message 410 to the DNS Proxy 104 including, among other things, the destination host global address. The DNS Proxy 104 sends a domain name resolution response message 412 to the local DNS Server in the source address domain, which, in turn, sends a domain name resolution response message 414 to the source host including, among other things, the destination host global address.

Figure 5:
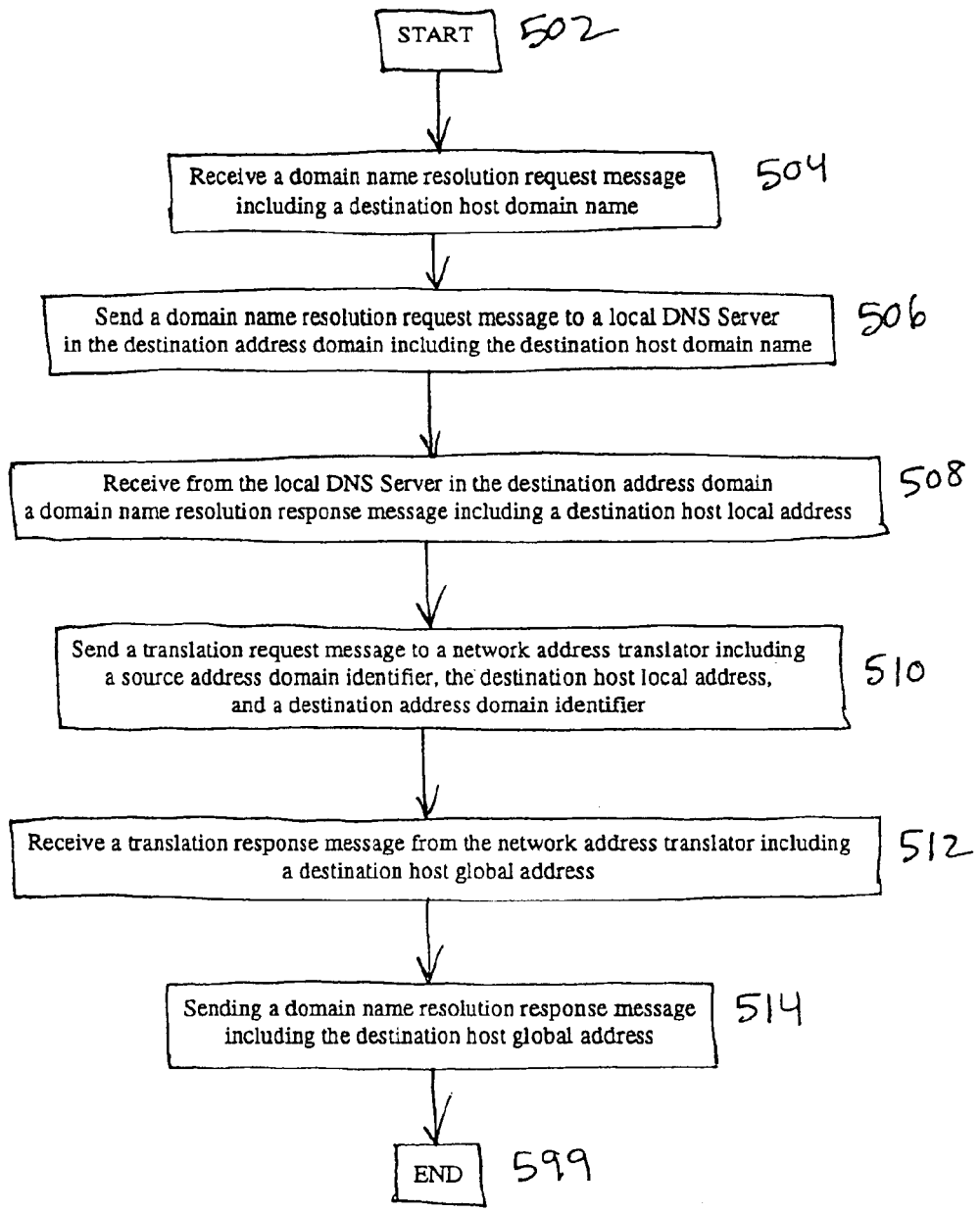
FIG. 5 is a logic flow diagram showing exemplary domain name system proxy logic for resolving a domain name into a destination host global address in accordance with a preferred embodiment of the present invention.

FIG. 5 is a logic flow diagram showing exemplary DNS Proxy 104 logic for resolving a domain name in a network having multiple overlapping address domains. Beginning in step 502, the DNS Proxy 104 receives the domain name resolution request message 403, in step 504. The domain name resolution request message 403 includes, among other things, the destination host domain name associated with the destination host in the destination address domain.

The DNS Proxy 104 sends the domain name resolution request message 404 to the local DNS Server in the destination address domain, in step 506. The domain name resolution request message 404 includes, among other things, the destination host domain name. The DNS Proxy 104 then monitors for the domain name resolution response message 406 from the local DNS Server in the destination address domain including the destination host local address.

Upon receiving the domain name resolution response message 406 including the destination host local address, in step 508, the DNS Proxy 104 sends the translation request message 408 to the NAT 102, in step 510. The translation request message 408 includes, among other things, the source address domain identifier, the destination host local address, and the destination address domain identifier. The DNS Proxy 104 then monitors for the translation response message 410 from the NAT 102 including the destination host global address.

Upon receiving the translation response message 410 from the NAT 102, in step 512, the DNS Proxy 104 sends the domain name resolution response message 412, in step 514. The domain name resolution response message 412 includes, among other things, the destination host global address. The DNS Proxy 104 logic terminates in step 599.

Figure 6:
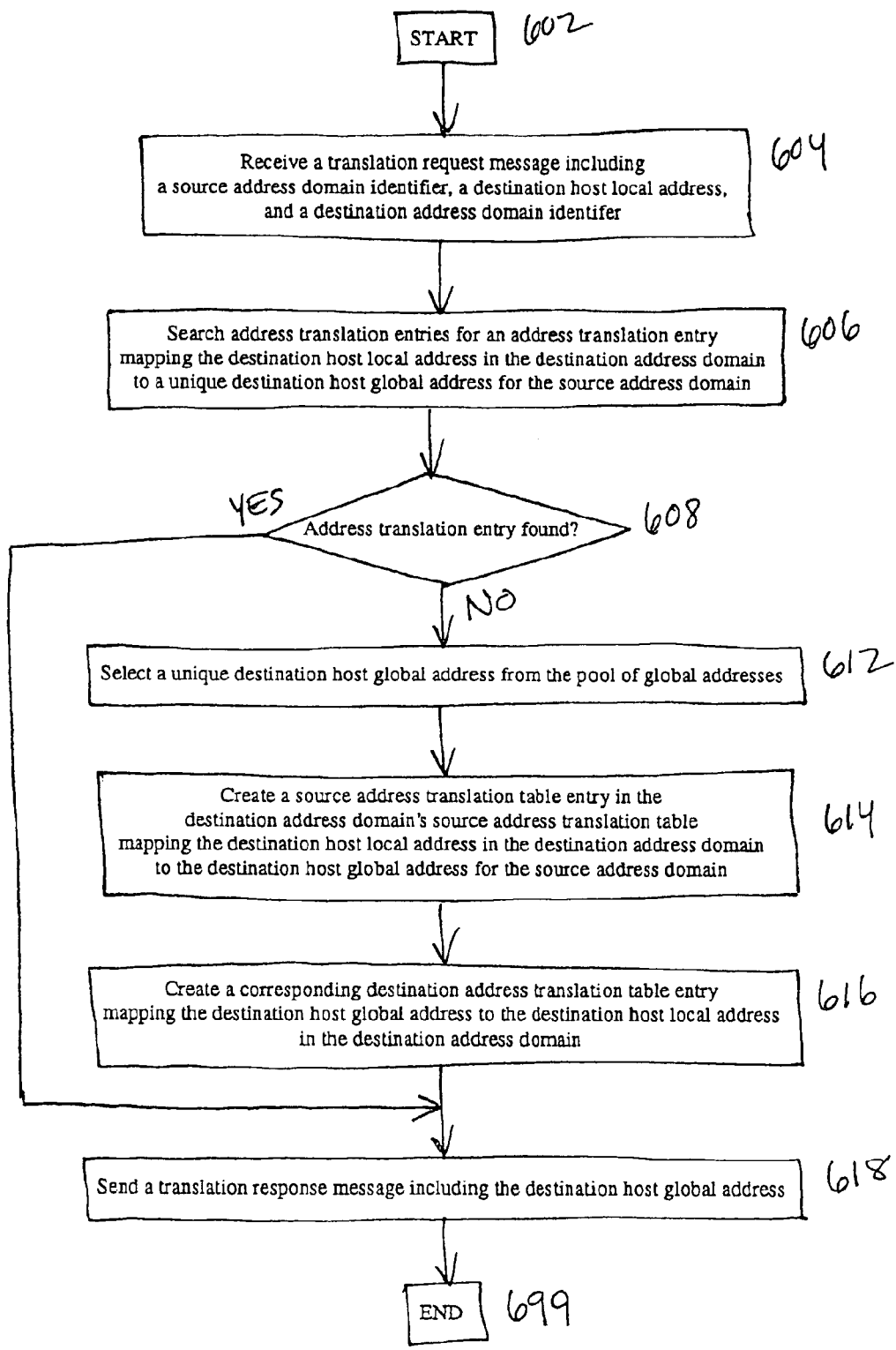
FIG. 6 is a logic flow diagram showing exemplary network address translator logic for translating a destination host local address into a destination host global address as part of a domain name resolution procedure in accordance with a preferred embodiment of the present invention.

FIG. 6 is a logic flow diagram showing exemplary NAT 102 logic for translating the destination host local address into the unique destination host global address that is specific to the source address domain as part of the domain name resolution procedure. Beginning in step 602, the NAT 102 receives the translation request message 408 from the DNS Proxy 104, in step 604. The translation request message 408 includes, among other things, the source address domain identifier, the destination host local address, and the destination address domain identifier. The NAT 102 then searches the address translation entries for an address translation entry mapping the destination host local address in the destination address domain to a unique destination host global address for the source address domain, in step 606. If the NAT 102 finds such an address translation entry (YES in step 608), then the NAT 102 proceeds to step 618. Otherwise (NO in step 608), the NAT 102 creates the source address translation table entry and the corresponding destination address translation entry.

In order to create the address translation table entries, the NAT 102 first selects a unique destination host global address, in step 612, preferably from a pool of global network addresses maintained by the NAT 102. Upon selecting the destination host global address in step 612, the NAT 102 creates a source address translation table entry in the destination address domain's source address translation table, in step 614, and a corresponding destination address translation table entry, in step 616. The source address translation table entry maps the destination host local address in the destination address domain to the destination host global address for the source address domain. The destination address translation table entry maps the destination host global address to the destination host local address in the destination address domain.

In step 618, the NAT 102 sends the translation response message 412 including the destination host global address. The NAT 102 logic terminates in step 699.

Once the source host has obtained the destination host global address, either through domain name resolution or some other means, the source host transmits a packet including, as the destination address, the destination host global address for the source address domain, and, as the source address, the source host local address. The destination address uniquely identifies the destination host within the communication network 100. However, the source address is an ambiguous address within the communication network 100.

Upon receiving the packet, the NAT 102 uses the destination address to determine, among other things, the destination address domain for the packet. However, the NAT 102 cannot simply route the packet to the destination host over the destination address domain using traditional routing techniques. This is because the destination address in the packet is not equal to the destination host local address in the destination address domain, and, consequently, the packet would not be received by the destination host in the destination address domain.

Therefore, after determining that the packet requires address translation, the NAT 102 translates the destination address from the destination host global address into the destination host local address. In order to translate the destination address, the NAT 102 uses the destination address translation table to obtain the destination host local address, specifically by finding the destination address translation table entry corresponding to the destination host global address and obtaining therefrom the destination host local address.

In certain situations, the NAT 102 may also have to translate the source address in the packet from the source host local address in the source address domain into a unique source host global address for the destination address domain. Such an address translation is required when the source host local address is an overlapping address within the communication network. The source address translation is done so that the destination host receives a globally unique source address that uniquely identifies the source host within the communication network. The source address can therefore be used by the destination host, for example, to send a response packet to the source host.

In order to translate the source address, the NAT 102 first determines both the source domain (either implicitly based upon the interface over which the packet is received or explicitly from the destination address translation table entry) and the destination domain (from the destination address translation table entry) for the packet The NAT 102 then searches the address translation entries to find an address translation entry mapping the source host local address in the source address domain to a source host global address for the destination address domain. If the NAT 102 finds such an address translation entry, then the NAT 102 translates the source address in the packet by extracting the source host global address from the address translation entry and replacing the source host local address in the packet with the source host global address. However, if there is no address translation entry mapping the source host local address in the source address domain to a source host global address for the destination address domain, then the NAT 102 dynamically allocates a source host global address for the destination address domain, creates the appropriate address translation entries, and translates the source address in the packet by replacing the source host local address in the packet with the dynamically allocated source host global address.

More specifically, the NAT 102 first selects the source host global address from a pool of network addresses. The NAT 102 then creates a source address translation table entry in the source address translation table for the source address domain and a corresponding destination address translation table entry in the destination address translation table. The source address translation table entry includes a Source Local Address field equal to the source host local address, a Source Address Domain field equal to the source address domain, a Destination Address Domain field equal to the destination address domain, and a Source Global Address field equal to the selected source host global address. The corresponding destination address translation table entry includes a Destination Global Address field equal to the selected source host global address, a Source Address Domain field equal to the destination address domain, a Destination Address Domain field equal to the source address domain, and a Destination Local Address field equal to the source host local address.

After translating either the destination address, the source address, or both addresses in the packet, the NAT forwards the translated packet to the destination host over the destination address domain.

The network address translations described above can be demonstrated by example. Two examples are set forth below. The first example follows the network address translations of a packet sent by the host X 110 to the host Y 120 and a corresponding response packet sent by the host Y 120 back to the host X 110. The second example follows the network address translations of a packet sent by the host X 110 to the host B 140 and a corresponding response packet sent by the host B 140 back to the host X 110. In these examples, it is assumed that the host X 110 has obtained the destination address using domain name resolution or some other means. For convenience, the convention (S, D) is used to indicate a packet having source address S and destination address D.

Figure 7:
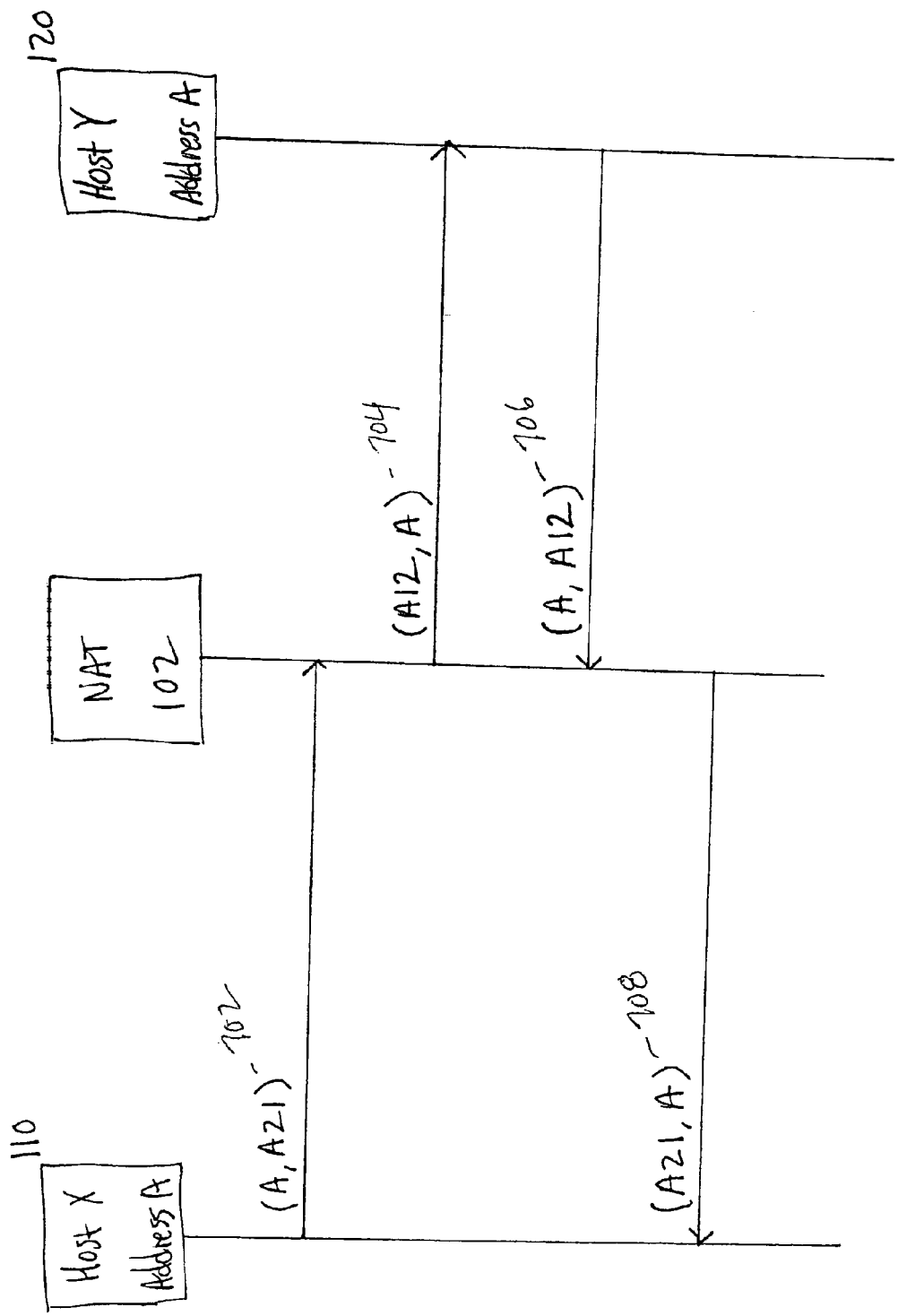
FIG. 7 is a message flow diagram showing an exemplary message flow for a first exemplary embodiment of the present invention.

FIG. 7 is a message flow diagram showing an exemplary packet exchange between the host X 110 in the address domain 1 and the host Y 120 in the address domain 2. The host X 110 transmits the packet 702 including, as the source address, the host X local address (i.e., A), and, as the destination address, the host Y global address for address domain 1 (i.e., A21). The host Y global address A21 uniquely identifies the host Y 120 within the communication network 100. However, the host X local address A is ambiguous within the communication network 100, since it does not uniquely identify the host X 110.

Upon receiving the packet 702, the NAT 102 determines that both the source address and the destination address require address translation. In order to translate the destination address, the NAT 102 uses the destination address translation table shown in FIG. 2D to find the destination address translation table entry 226 corresponding to the destination address A21, and obtains therefrom the host Y local address A. In order to translate the source address, the NAT 102 obtains the destination address domain from the destination address translation table entry 226 (i.e., address domain 2), and also determines the source address domain (i.e., address domain 1) either implicitly based upon the interface over which the packet 702 is received or explicitly from the destination address translation table entry 226. The source address domain indicates the particular source address translation table required for the source address translation, which, in this example, is the source address translation table for address domain 1 shown in FIG. 2A. The NAT 102 finds the source address translation table entry 202 corresponding to the host X local address for destination (outbound) address domain 2, and obtains therefrom the host X global address for address domain 2 (i.e., A12). The NAT 102 then formats the packet 704 including, as the source address, the host X global address for address domain 2 (i.e., A12), and, as the destination address, the host Y local address (i.e., A). The NAT 102 forwards the packet 704 to the host Y 120 over the address domain 2.

Upon receiving the packet 704, the host Y 120 may transmit a response packet 706 including, as the source address, the host Y local address (i.e., A), and, as the destination address, the host X global address for address domain 2 (i.e., A12), typically copied from the source address of the packet 704. The host X global address A12 uniquely identifies the host X 110 within the communication network 100. However, the host Y local address A is ambiguous within the communication network 100, since it does not uniquely identify the host Y 120.

Upon receiving the packet 706, the NAT 102 determines that both the source address and the destination address require address translation. In order to translate the destination address, the NAT 102 uses the destination address translation table shown in FIG. 2D to find the destination address translation table entry 220 corresponding to the destination address A12, and obtains therefrom the host X local address A. In order to translate the source address, the NAT 102 obtains the destination address domain from the destination address translation table entry 220 (i.e., address domain 1), and also determines the source address domain (i.e., address domain 2) either implicitly based upon the interface over which the packet 706 is received or explicitly from the destination address translation table entry 220. The source address domain indicates the particular source address translation table required for the source address translation, which, in this example, is the source address translation table for address domain 2 shown in FIG. 2B. The NAT 102 finds the source address translation table entry 208 corresponding to the host Y local address for destination (outbound) address domain 1, and obtains therefrom the host Y global address for address domain 1 (i.e., A21). The NAT 102 then formats the packet 708 including, as the source address, the host Y global address for address domain 1 (i.e., A21), and, as the destination address, the host X local address (i.e., A). The NAT 102 forwards the packet 708 to the host X 110 over the address domain 1.

Figure 8:
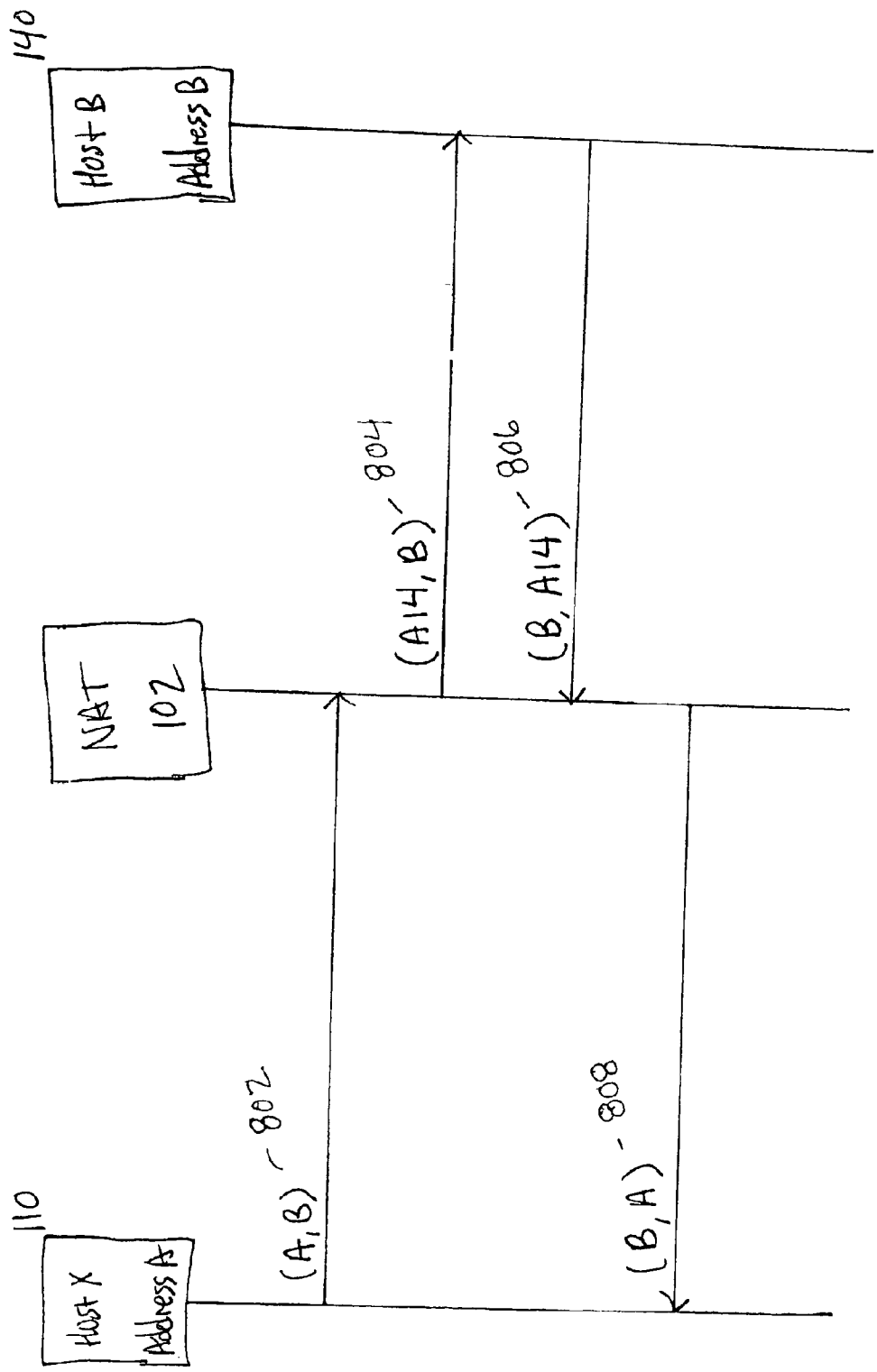
FIG. 8 is a message flow diagram showing an exemplary message flow for a second exemplary embodiment of the present invention.

FIG. 8 is a message flow diagram showing an exemplary packet exchange between the host X 110 in the address domain 1 and the host B 140 in the address domain 4. The host X 110 transmits the packet 802 including, as the source address, the host X local address (i.e., A), and, as the destination address, the host B network address (i.e., B). The host B network address B uniquely identifies the host B 140 within the communication network 100. However, the host X local address A is ambiguous within the communication network 100, since it does not uniquely identify the host X 110.

Upon receiving the packet 802, the NAT 102 determines that only the source address requires address translation. In order to translate the source address, the NAT 102 determines the destination address domain, for example, by finding the destination address translation table entry 238 in the destination address translation table, and obtaining therefrom the destination (outbound) domain (i.e., address domain 4). The NAT 102 also determines the source address domain (i.e., address domain 1) implicitly based upon the interface over which the packet 502 is received (there is no explicit source address domain associated with the network address B). The source address domain indicates the particular source address translation table required for the source address translation, which, in this example, is the source address translation table for address domain 1 shown in FIG. 2A. The NAT 102 finds the source address translation table entry 206 corresponding to the host X local address for destination (outbound) address domain 4, and obtains therefrom the host X global address for address domain 4 (i.e., A14). The NAT 102 then formats the packet 804 including, as the source address, the host X global address for address domain 4 (i.e., A14), and, as the destination address, the host B network address (i.e., B). The NAT 102 forwards the packet 804 to the host B 140 over the address domain 4.

Upon receiving the packet 804, the host B 140 may transmit a response packet 806 including, as the source address, the host B network address (i.e., B), and, as the destination address, the host X global address for address domain 4 (i.e., A14), typically copied from the source address of the packet 804. The host X global address A14 uniquely identifies the host X 110 within the communication network 100. The host B network address B is unambiguous within the communication network 100.

Upon receiving the packet 806, the NAT 102 determines that only the destination address requires address translation. In order to translate the destination address, the NAT 102 uses the destination address translation table shown in FIG. 2D to find the destination address translation table entry 224 corresponding to the destination address A14, and obtains therefrom the host X local address A. The NAT 102 then formats the packet 808 including, as the source address, the host B network address B, and, as the destination address, the host X local address A. The NAT 102 forwards the packet 808 to the host X 110 over the address domain 1.

Figure 9:
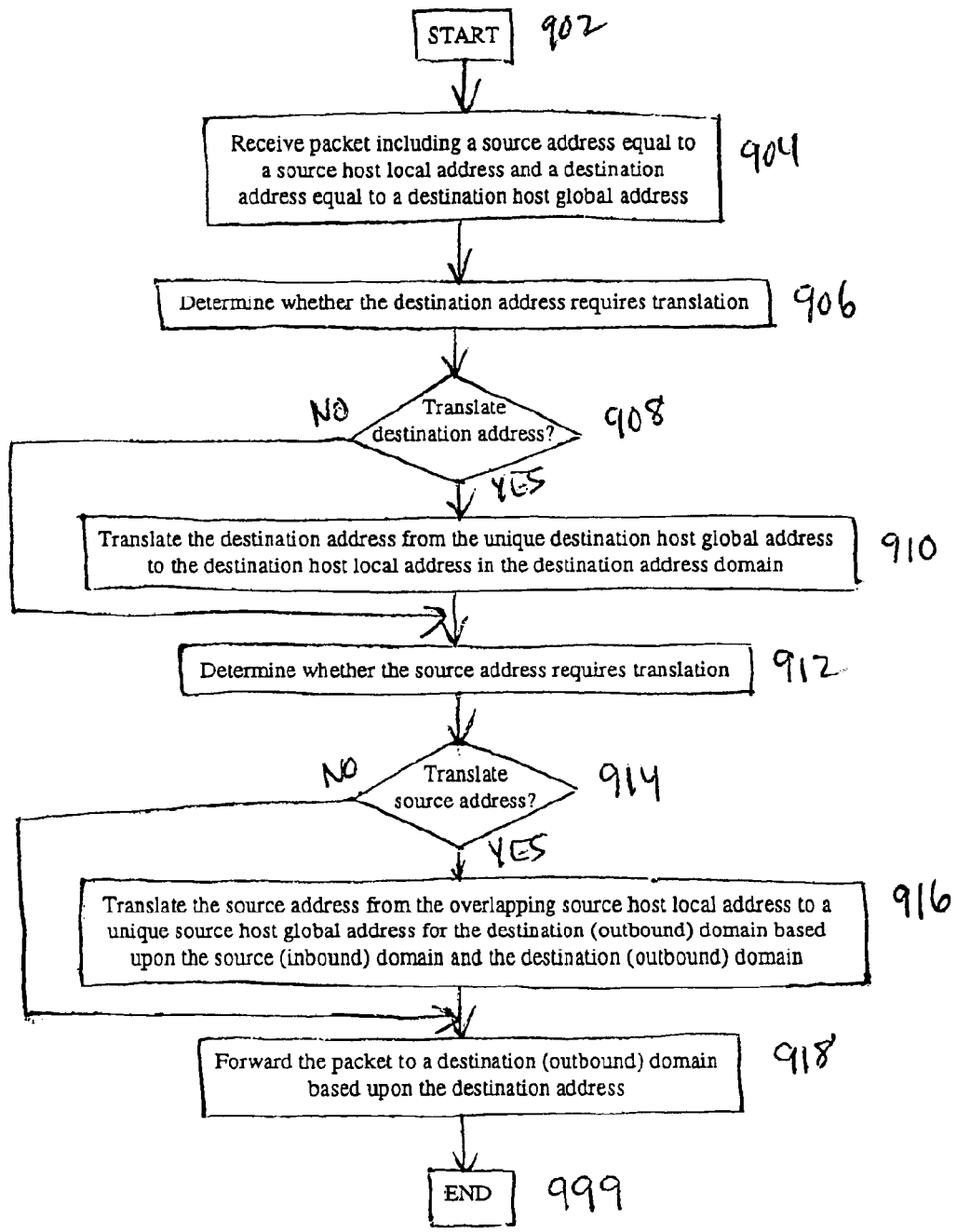
FIG. 9 is a logic flow diagram showing exemplary network address translator logic for performing network address translation on a packet in accordance with a preferred embodiment the present invention.

FIG. 9 is a logic flow diagram showing exemplary NAT 102 logic for processing a packet received from the source host. Beginning in step 902, the NAT 102 receives from the source host a packet including a source address equal to a source host local address and a destination address equal to a destination host global address, in step 904. The destination host global address is, by definition, a unique address within the communication network 100, although the destination host global address may or may not need to be translated into a destination host local it address in the destination address domain. The source host local address may be either a unique address within the communication network 100 or an overlapping address that needs to be translated into a source host global address for the destination address domain.

Therefore, upon receiving the packet in step 904, the NAT 102 determines whether the destination address requires translation, in step 906. If the destination address requires translation (YES in step 908), then the NAT 102 translates the destination address from the unique destination host global address to the destination host local address in the destination in address domain, in step 910, as described in detail with respect to FIG. 10A below.

Whether or not the destination address requires translation, the NAT 102 also determines whether the source address requires translation, in step 912. If the source address requires translation (YES in step 914), then the NAT 102 translates the source address from the overlapping source host local address to the unique source host global address for the destination address domain, in step 916, as described in detail with respect to FIG. 10B below.

After performing any required address translations, the NAT 102 forwards the translated packet into the destination address domain, in step 918. The NAT 102 logic terminates in step 999.

Figure 10A:
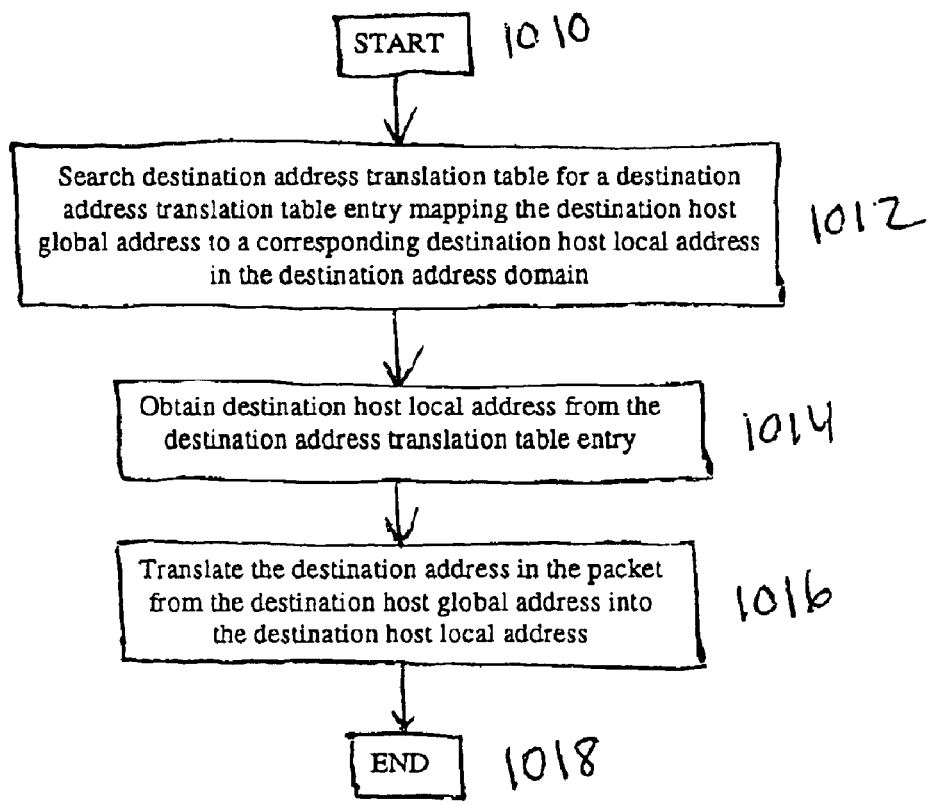
FIG. 10A is a logic flow diagram showing exemplary destination address translation logic for translating a destination address from a destination host global address into a destination host local address in a destination (outbound) address domain in accordance with a preferred embodiment of the present invention.

FIG. 10A is a logic flow diagram showing exemplary NAT 102 destination address translation logic 910 in a preferred embodiment of the present invention. Beginning in step 1010, the NAT 102 searches the destination address translation table for a destination address translation table entry corresponding to the destination host global address, in step 1012, specifically by searching the destination address translation table for a destination address translation table entry having a Destination Global Address field equal to the destination host global address. Upon finding the destination address translation table entry in step 1012, the NAT 102 obtains the destination host local address from the destination address translation table entry, in step 1014, specifically by obtaining the destination host local address from the Destination Local Address field of the destination address translation table entry. Upon obtaining the destination host local address in step 1014, the NAT 102 translates the destination address in the packet from the destination host global address into the destination host local address, in step 1016. The destination address translation logic terminates in step 1018.

Figure 10B:
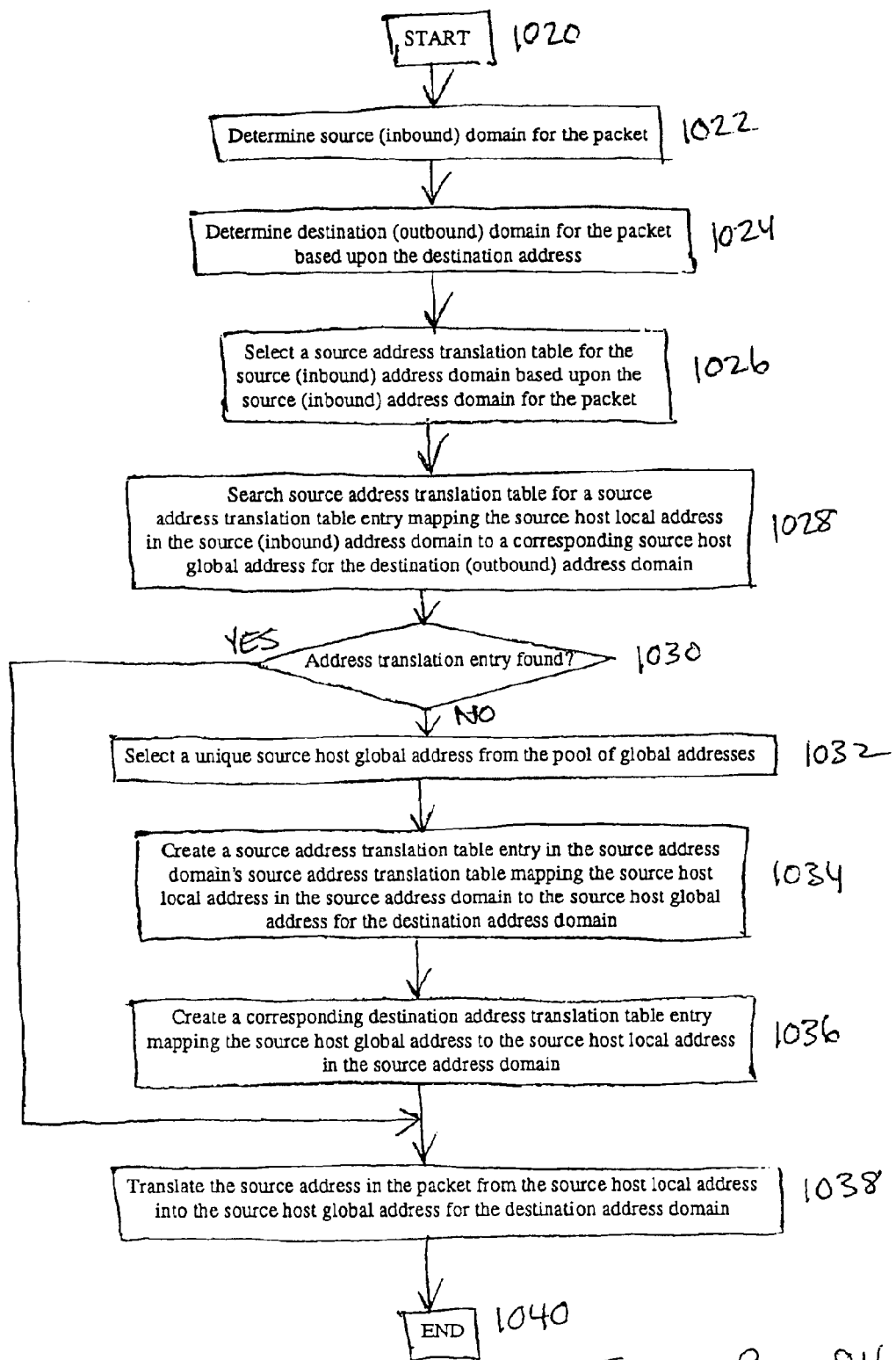
FIG. 10B is a logic flow diagram showing exemplary source address translation logic for translating a source address from a source host local address into a source host global address for the destination (outbound) address domain in accordance with a preferred embodiment of the in present invention.

FIG. 10B is a logic flow diagram showing exemplary NAT 102 source address translation logic 916 in a preferred embodiment of the present invention. Beginning in step 1020, the NAT 102 determines the source (inbound) domain for the packet, in step 1022, for example, based upon the Source Address Domain field of the destination address translation table entry or the NAT 102 network interface over which the packet was received. The NAT 102 also determines the destination (outbound) domain for the packet based upon the destination address in the packet, in step 1024, typically as part of the preceding destination address translation. Assuming that the NAT 102 maintains a separate source address translation table for each overlapping address domain, the NAT 102 proceeds to select a source address translation table for the source (inbound) domain, in step 1026, based upon the source (inbound) domain for the packet determined in step 1022. The NAT 102 then searches the source address translation table for a source address translation table entry mapping the source host local address in the source (inbound) address domain to the source host global address for the destination (outbound) address domain, in step 1028, specifically by searching the source address translation table for a source address translation table entry having a Source Local Address field equal to the source host local address and a Destination Address Domain field equal to the destination (outbound) domain determined in step 1024.

If the source address translation table entry is found (YES in step 1030), then the NAT 102 proceeds to translate the source address in the packet from the source host local address into the source host global address for the destination (outbound) address domain, in step 1038. In particular, the NAT 102 obtains the source host global address from the Source Global Address field of the source address translation table entry, and replaces the source host local address in the packet with the source host global address. The source address translation logic then terminates in step 1040.

However, if the source address translation table entry is not found (NO in step 1030), then the NAT 102 dynamically allocates a source host global address for the destination address domain, creates the appropriate address translation entries, and translates the source address in the packet by replacing the source host local address in the packet with the dynamically allocated source host global address. In particular, the NAT 102 first selects a unique source host global address from a pool of network addresses, in step 1032. The NAT 102 then creates a source address translation table entry in the source (inbound) address domain's source address translation table mapping the source host local address in the source (inbound) address domain to the source host global address for the destination (outbound) address domain, in step 1034, and creates a corresponding destination address translation table entry in the destination address translation table mapping the source host global address to the source host local address in the source (inbound) address domain, in step 1036. The NAT 102 then translates the source address in the packet from the source host local address into the source host global address for the destination (outbound) address domain, in step 1038, specifically by replacing the source host local address in the packet with the source host global address. The source address translation logic then terminates in step 1040.

Figure 11:
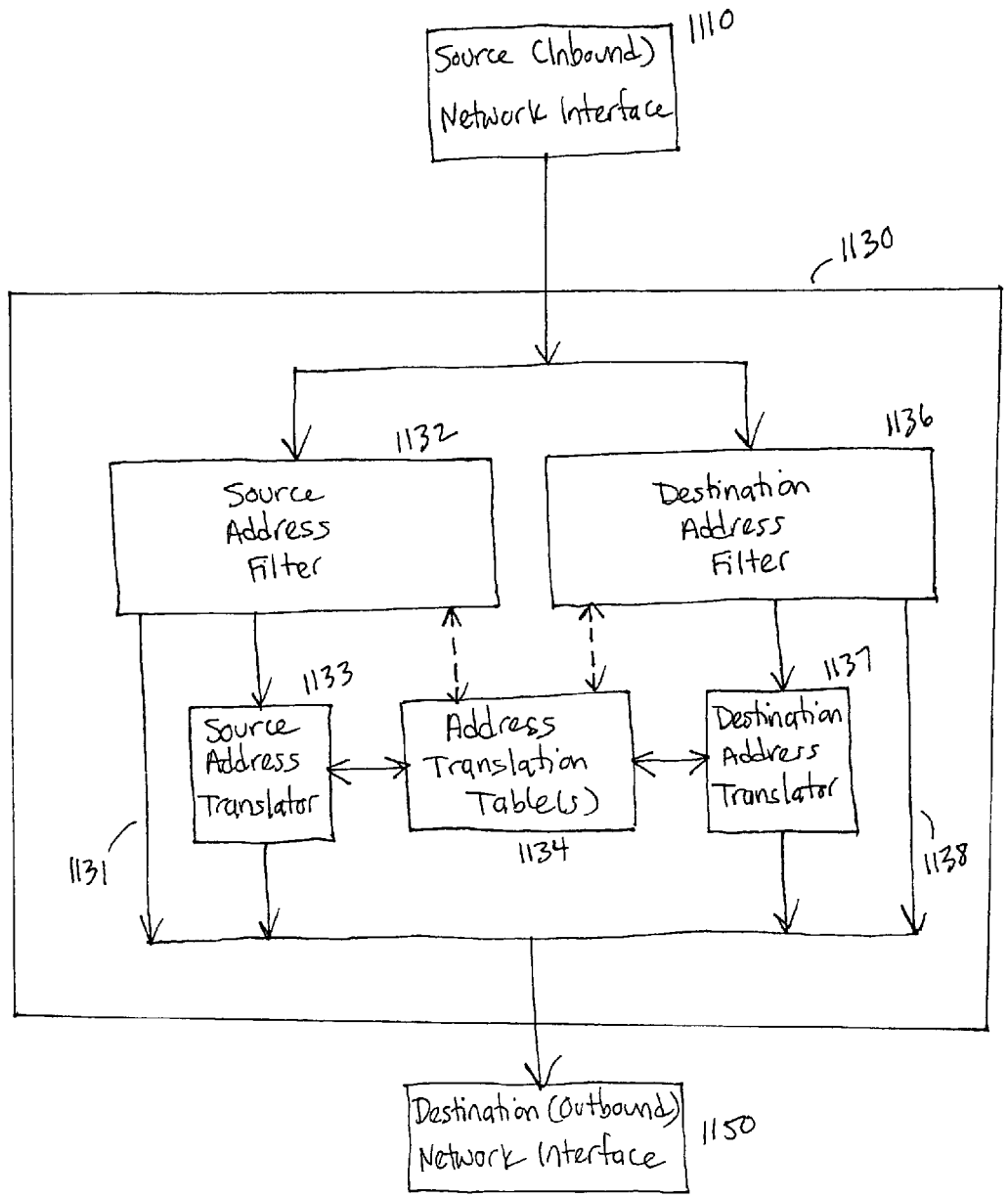
FIG. 11 is a block diagram showing an exemplary network address translator in accordance with a preferred embodiment of the present invention.

FIG. 11 is a block diagram showing an exemplary NAT 102 in accordance with a preferred embodiment of the present invention. The NAT 102 is operably coupled to at least a source (inbound) address domain of the communication network 100 by way of a Source (Inbound) Network Interface 1110 and to a destination (outbound) address domain of the communication network 100 by way of a Destination (Outbound) Network Interface 1150. Packets received over the Source (Inbound) Network Interface 1110 are processed by a Packet Processor 1130. The Packet Processor 1130 is operably coupled to perform any necessary address translations on the packet. The translated packets are forwarded to the destination (outbound) address domain via the Destination (Outbound) Network Interface 1150.

The Packet Processor 1130 includes both destination address translation logic (1136, 1137) and source address translation logic (1132, 1133). The destination address translation logic translates a destination host global address into a destination host local address in the destination (outbound) address domain, if such a translation is determined to be required. The source address translation logic translates a source host local address in the source (inbound) address domain into a source host global address for the destination (outbound) address domain, if such a translation is determined to be required. It should be noted that the destination address translation logic and the source address translation logic are shown as being operably coupled in parallel for convenience only. In a preferred embodiment of the present invention, the source address translation logic operates after completion of the destination address translation logic, and preferably obtains the source (inbound) address domain and the destination (outbound) address domain from the destination address translation table entry that is used by the destination address translation logic for translating the destination address in the packet.

The destination address translation logic determines whether the destination address requires translation, and translates the destination address from a destination host global address into a destination host local address if destination address translation is required. Specifically, the packet is processed by a Destination Address Filter 1136, which determines whether or not the destination address in the packet requires translation. The Destination Address Filter 1136 may utilize address translation information stored in the Address Translation Table(s) 1134, and particularly in a destination address translation table, in order to determine whether or not the destination address in the packet requires translation. If the Destination Address Filter 1136 determines that the destination address in the packet does not require address translation, then the Destination Address Filter 1136 forwards the packet unchanged via the path 1138. However, assuming that the Destination Address Filter 1136 determines that the destination address in the packet does require address translation, then the Destination Address Translator 1137 translates the destination address from the destination host global address into the destination host local address in the destination (outbound) address domain, specifically by finding a destination address translation table entry in the Address Translation Table(s) 1134 corresponding to the destination host global address, obtaining the destination host local address from the destination in address translation table entry, and inserting the destination host local address into the destination address field of the packet.

The source address translation logic determines whether the source address requires translation, and translates the source address from a source host local address into a source host global address for the destination (outbound) address domain if source address translation is required. Specifically, the packet is processed by a Source Address Filter 1132, which determines whether or not the source address in the packet requires translation. The Source Address Filter 1132 may utilize address translation information stored in the Address Translation Table(s) 1134 to determine whether or not the source address in the packet requires translation. If the Source Address Filter 1132 determines that the source address in the packet does not require address translation, then the Source Address Filter 1132 forwards the packet unchanged via the path 1131. However, assuming that the Source Address Filter 1132 determines that the source address in the packet does require address translation, then the Source Address Translator 1133 translates the source address from the source host local address into the source host global address for the destination (outbound) address domain, specifically by selecting a source address translation table for the source (inbound) address domain, searching the source address translation table for a source address translation table entry corresponding to the source host local address and the destination (outbound) address domain, obtaining the source host global address from the source address translation table entry, and inserting the source host global address into the source address field of the packet.

In a preferred embodiment of the present invention, predominantly all of the NAT 102 logic and DNS Proxy 104 logic for processing messages and translating network addresses is implemented as a set of computer program instructions that are stored in a computer readable medium and executed by an embedded microprocessor system within the NAT 102 and the DNS Proxy 104, respectively. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for translating addresses in a communication network having multiple overlapping address domains. The method involves receiving an overlapping local address from an inbound address domain, and translating the overlapping local address from the inbound address domain into a unique global address that is specific to a specified outbound address domain.

The present invention may also be embodied as a program product comprising a computer readable medium having embodied therein a computer program for translating addresses in a communication network having multiple overlapping address domains. The computer program includes receiving logic that is programmed to receive an overlapping local address from an inbound address domain. The computer program also includes translating logic that is programmed to translate the overlapping local address from the inbound address domain into a unique global address that is specific to a specified outbound address domain.

The present invention may also be embodied as an apparatus for translating addresses in a communication network having multiple overlapping address domains. The apparatus includes receiving logic that is operably coupled to receive an overlapping local address from an inbound address domain. The apparatus also includes translating logic that is operably coupled to translate the overlapping local address from the inbound address domain into a unique global address that is specific to a specified outbound address domain.

The present invention may also be embodied as a method for translating addresses in a communication system including a source host in a source (inbound) address domain in communication with a destination host in a destination (outbound) address domain by way of a network address translator. The method involves transmitting, by the source host in the source (inbound) address domain, a packet including a source address equal to a source host local address and a destination address equal to a destination host global address; receiving the packet by the network address translator; translating, by the network address translator, at least the source address from the source host local address to a unique source host global address that is specific to the destination (outbound) address domain; and forwarding the translated packet by the network address translator to the destination host in the destination (outbound) address domain. The method may also involve translating, by the network address translator, the destination address from the destination host global address to a destination host local address for the destination (outbound) address domain.

The present invention may also be embodied as a communication system including a source host in a source (inbound) address domain, a destination host in a destination (outbound) address domain, and a network address translator in communication with the source host and the destination host, wherein the source host is operably coupled to transmit to the network address translator a packet including a source address equal to a source host local address in the source (inbound) address domain, and the network address translator is operably coupled to translate at least the source address of the packet from the source host local address to a unique source host global address that is specific to the destination (outbound) address domain, and is further operably coupled to forward the translated packet to the destination host in the destination (outbound) address domain. The network address translator may also be operably coupled to translate the destination address of the packet from the destination host global address to a destination host local address in the destination (outbound) address domain The present invention may be embodied in other specific forms without departing from the essence or essential characteristics. The described embodiments are to be considered in all respects only as illustrative and not restrictive.

It should be noted that the term "packet" is used herein as a generic term for a unit of information that is processed by the NAT, and should not be construed to limit application of the present invention to a specific information format or communication protocol. Thus, a packet may be any unit of information for use with any protocol including, but not limited to, a frame, a packet, a datagram, a user datagram, or a cell.

We claim:

1. A method of translating addresses in a communication network having multiple overlapping address domains, the method comprising the steps of:

receiving an overlapping local address from an inbound address domain, wherein the overlapping local address is a destination host local address from a destination address domain;

receiving a translation request message as part of a domain name resolution procedure, wherein the translation request message includes the overlapping local address and further specifies an outbond address domain; and translating an overlapping local address from the inbound address domain into a unique global address that is specific to a specified outbound address domain, wherein the step of translating the overlapping local address from the inbound address domain into the unique global address that is specific to the specified outbound address domain comprises the steps of:

selecting the unique global address from among a number of available global network addresses; and mapping the unique global address to the overlapping local address from the inbound address domain exclusively for the specified outbound address domain.

2. The method of claim 1, wherein the step of translating the overlapping local address from the inbound address domain into the unique global address that is specific to the specified outbound address domain comprises the steps of:

maintaining a number of address translation entries, each address translation entry mapping a local address from one of a number of overlapping inbound address domains to a corresponding global address that is specific to one of a number of overlapping outbound address domains;

finding an address translation entry mapping the overlapping local address from the inbound address domain to the unique global address that is specific to the specified outbound address domain; and extracting the unique global address from the address translation entry.

3. The method of claim 2 wherein each address translation entry comprises an inbound local address field, an outbound address domain field, and an outbound global address field, and wherein the step of maintaining the number of address translation entries comprises:

selecting a network address from among a number of available network addresses; and creating an address translation entry having the inbound local address field equal to the local address, the outbound address domain field equal to the specified outbound address domain, and the outbound global address field equal to the selected network address.

4. The method of claim 2 wherein each address translation entry comprises an inbound local address field, an outbound address domain field, and an outbound global address field, and wherein the step of finding the address translation entry mapping the overlapping local address from the inbound address domain to the unique global address that is specific to the specified outbound address domain comprises finding the address translation entry having the inbound local address field equal to the overlapping local address and the outbound address domain field equal to the specified outbound address domain.

5. The method of claim 1, wherein the outbound address domain is a source address domain.

6. The method of claim 1, further comprising the step of transmitting a translation response message including the unique global address.

7. The method of claim 1, wherein the step of receiving the overlapping local address from the inbound address domain comprises receiving a packet from a source host in a source (inbound) address domain that is destined for the destination host in the destination (outbound) address domain and includes a source address equal to an overlapping source host local address from the source (inbound) address domain and a destination address equal to a unique destination host global address.

8. The method of claim 7, wherein the step of translating the overlapping local address from the inbound address domain into the unique global address that his specific to the specified outbound address domain comprises the steps of:

maintaining a number of source address translation entries, each source address translation entry mapping a source host local address from one of a number of overlapping source (inbound) address domains to a corresponding source host global address that is specific to one of a number of overlapping destination (outbound) address domains;

determining the source (inbound) address domain for the packet;

determining the destination (outbound) address domain for the packet;

translating the source address in the packet from the overlapping source host local address in the source (inbound) address domain into a unique source host global address that is specific to the destination (outbound) address domain; and forwarding the translated packet to the destination host over the destination (outbound) address domain.

9. The method of claim 8, wherein the step of translating the source address in the packet comprises the steps of:

selecting the source host global address from a pool of network addresses; and creating a source address translation entry mapping he overlapping source host local address from the source (inbound) address domain for the packet to the source host global address that is specific to the destination (outbound) address domain for the packet.

10. The method of claim 8, wherein the step of translating the source address in the packet comprises the steps of:

finding a source address translation entry mapping the overlapping source host local address from the source (inbound) address domain for the packet to a unique source host global address that is specific to the destination (outbound) address domain for the packet;

extracting the source host global address from the source address translation entry.

11. The method of claim 10, wherein the step of maintaining the number of source address translation entries comprises maintaining a number of source address translation tables, each source address translation table consisting of those source address translation entries mapping the source host local addresses from a common source (inbound) address domain, and wherein the step of finding the source address translation entry mapping the overlapping source host local address from the source (inbound) address domain for the packet to the unique source host global address that is specific to the destination (outbound) address domain for the packet comprises selecting a source address translation table based upon the source (inbound) address domain for the packet.

12. The method of claim 11, wherein each source address translation entry comprises a source local address field, a destination (outbound) address domain field, and a source global address field, and wherein the step of finding the source address translation entry mapping the overlapping source host local address from the source (inbound) a domain for the packet to the unique source host global address that is specific to the destination (outbound) address domain for the packet comprises finding the source address translation entry having the source local address field equal to the overlapping source host local address and the destination (outbound) address domain field equal to the destination (outbound) address domain for the packet.

13. The method of claim 11, wherein each source address translation entry comprises a source local address field, a source (inbound) address domain field, a destination (outbound) address domain field, and a source global address field, and wherein the step of finding the source address translation entry mapping the overlapping source host local address from the source (inbound) address domain for the packet to the unique source host global address that is specific to the destination (outbound) address domain for the packet comprises finding the source address translation entry having the source local address field equal to the overlapping source host local address, the source (inbound) address domain field equal to the source (inbound) address domain for the packet, and the destination (outbound) address domain field equal to the destination (outbound) address domain for the packet.

14. The method of claim 8, wherein the step of determining the source (inbound) address domain for the packet comprises determining the source (inbound) address domain for the packet implicitly based upon a network interface over which the packet is received.

15. The method of claim 8, further comprising the step of maintaining a number of destination address translation entries, each destination address translation entry mapping a destination host global address that is specific to a source (inbound) address domain to a corresponding destination host local address for a corresponding destination (outbound) address domain.

16. The method of claim 15, wherein each destination address translation entry maps a destination host global address to a corresponding destination (outbound) address domain, and wherein the step of determining the destination (outbound) address domain for the packet comprises the steps of:

finding a destination address translation entry for the destination host global address in the packet; and extracting the destination (outbound) address domain from the destination address translation entry.

17. The method of claim 15, wherein each destination address translation entry maps the destination host global address to a corresponding source (inbound) address domain, and wherein the step of determining the source (inbound) address domain for the packet comprises the steps of:

finding a destination address translation entry for the destination host global address in the packet; and extracting the source (inbound) address domain from the destination address translation entry.

18. The method of claim 15, wherein each destination address translation entry maps the destination host global address to a corresponding destination host local address for the destination (outbound) address domain, and wherein the method further comprises the steps of:

finding a destination address translation entry for the destination host global address in the packet;

extracting the destination host local address from the destination address translation entry; and translating the destination address in the packet from the destination host global address to the corresponding destination host local address extracted from the destination address translation entry.

* * * * *